June 7, 1960  J. NAGY, JR  2,940,043
APPARATUS FOR THE MEASUREMENT OF VOLTAGES
Filed Sept. 9, 1954
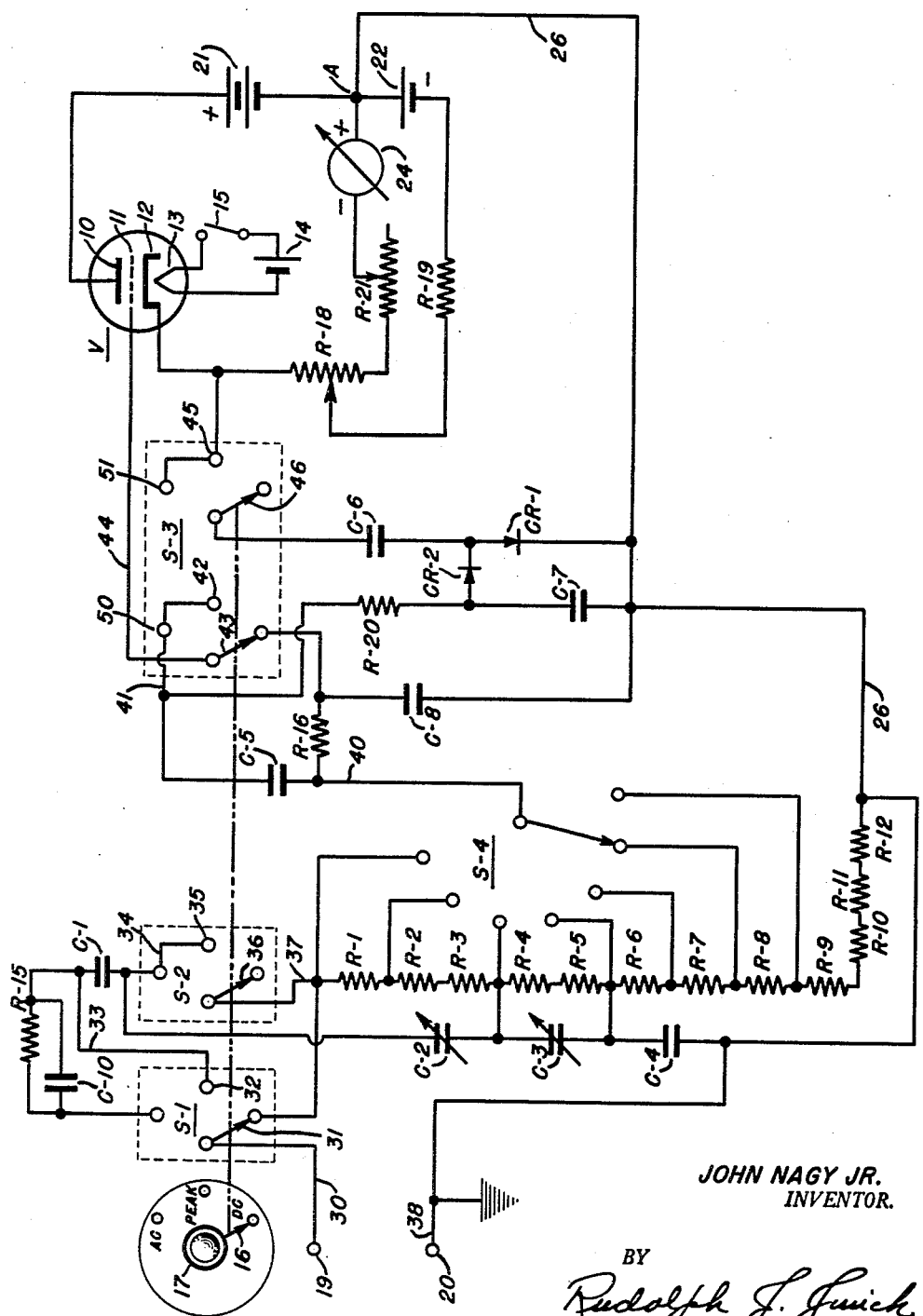
JOHN NAGY JR.
INVENTOR.
BY
Rudolph J. Gunich
ATTORNEY

United States Patent Office 2,940,043
Patented June 7, 1960

2,940,043
APPARATUS FOR THE MEASUREMENT OF VOLTAGES

John Nagy, Jr., Newark, N.J., assignor, by mesne assignments, to Daystrom, Incorporated, Murray Hill, N.J., a corporation of New Jersey Filed Sept. 9, 1954, Ser. No. 454,980

5 Claims. (Cl. 324—103)

This invention relates to apparatus for the measurement of electrical voltages and more particularly to a vacuum tube voltmeter incorporating a novel circuit for the measurement of peak-to-peak voltages and which circuit is also adapted for the conventional measurement of A.-C. and D.-C. voltages.

Vacuum tube voltmeters are well known in the electrical measurement art. Such apparatus is particularly useful in applications wherein the impedance presented to the circuit under measurement must be high, in the order of megohms, one such specific application being the measurement of the amplitude of wave shapes in testing a television receiver. Aside from the necessary high input impedance characteristic, a good vacuum tube voltmeter should possess the features of a simple, easy-to-read scale on the indicating instrument, adaptability to measure A.-C., D.-C. and peak-to-peak voltages through the manipulation of a simple switching arrangement, a good frequency response, and a high stability, that is, the zero setting of the indicating instrument should remain constant throughout the various voltage ranges of the apparatus.

A vacuum tube voltmeter made in accordance with my invention possesses all these desirable features. My novel peak-to-peak voltage measuring circuit utilizes a vacuum tube to provide a high impedance input circuit and a low impedance output circuit, the latter incorporating a pair of rectifiers and capacitors to produce a D.-C. voltage that is proportional to the peak-to-peak voltage input. Such D.-C. voltage is applied to the input of the vacuum tube in such manner as to be superimposed upon the A.-C. input voltage while maintaining isolation therebetween. The resultant D.-C. output voltage of the tube is impressed across the terminals of a D.-C. indicating instrument having an appropriately calibrated scale.

An object of this invention is the provision of an electronic measuring instrument adapted for the measurement of D.-C., A.-C. and peak-to-peak voltages and having extreme stability of zero reading with changes in the character and magnitude of the voltages to be measured.

An object of this invention is the provision of a vacuum tube voltmeter including an indicating instrument having a single, graduated scale for reading D.-C., A.-C. and peak-to-peak voltages and wherein such multiple-purpose scale does not require the use of corrective factors.

An object of this invention is the provision of a novel electronic circuit for the measurement of peak-to-peak voltages and which circuit is also adapted to the measurement of conventional A.-C. and D.-C. voltages.

An object of this invention is the provision of voltage-measuring apparatus comprising an electron tube having an input circuit to be energized by an A.-C. voltage to be measured and an output circuit, a capacitor-rectifier network connected in the tube output circuit so as to superpose a D.-C. voltage component on the tube input, and a D.-C. indicating instrument responsive to the resultant D.-C. output voltage of the tube and having a scale calibrated in terms of the peak-to-peak values of the voltage being measured.

These and other objects and advantages will become apparent from the following description when taken with the accompanying circuit diagram of voltage-measuring apparatus made in accordance with this invention. It will be understood that the drawing is for purposes of description and is not to be construed as defining the scope or limits of the invention, reference being had for the latter purpose to the claims appended hereto.

Referring now to the circuit diagram, the vacuum tube V, which may be a type 6C4, has an anode 10, control grid 11, cathode 12 and a heater filament 13, the latter being energized by the battery 14 upon closure of the switch 15. The switches S–1, S–2 and S–3 are of the rotary type having their rotary contact arms secured to a common shaft which carries an index pointer 16 cooperating with the reference markings labeled A—C, PEAK and D—C as shown. Rotation of the switch shaft, by the knob 17, to aline the index pointer with a selected reference marking conditions the circuitry for the measurement of either direct voltages, alternating voltages or peak voltages as will be explained in detail hereinbelow. In the illustrated position the switches S–1, S–2 and S–3 are set for the measurement of a direct current voltage applied to the circuit input terminals 19, 20. It will be noted that the tube anode is energized by the battery 21 and the cathode is biased by the battery 22 through the fixed resistor R–19 and the adjustable resistor R–18. One side of the indicating instrument 24 is connected to the common lead of the batteries 21, 22 and the other side of the instrument is connected, through the adjustable resistor R–21, to the resistor R–18. It will be noted that the instrument 24 is connected across opposed diagonals of a four-arm bridge, two adjacent bridge arms being constituted by the batteries 21, 22 and the other two adjacent bridge arms being constituted by the fixed resistor 19 on the one side and by the tube V and resistor 18 on the other side. The resistor R–18 is the zero adjuster and its ohmic value is adjusted until the effective resistance of the tube V is equal to that of the adjacent bridge arm resistor R–19. Under such condition, the bridge is balanced and no current flows through the indicating instrument 24.

If, now, a voltage is impressed between the tube grid and the bridge junction A, the effective resistance of the tube changes and the bridge becomes unbalanced, thereby effecting an indication on the instrument. Whenever the grid of the tube goes positive the tube conducts more readily and its resistance is relatively lower. If, on the other hand, the grid goes negative, the conductivity of the tube decreases and its resistance becomes relatively high. The tube V, therefore, functions similar to a variable resistance. The voltage so applied to the bridge is that voltage which is impressed across the circuit terminals 19, 20, it being noted that the bridge junction A is connected directly to the terminal 20 by the lead 26, whereas the tube grid is connected to the terminal 19 through various components determined by the setting of the selector switches S–1, S–2 and S–3, and the range-changing switch S–4.

It will also be noted that the current flow in the tube plate circuit opposes the current flow through the other half, or bucking portion, of the bridge. The resistor R–18 is adjusted until these two currents are equalized. A constant 10 megohm input resistance is derived from an input grid divider network consisting of the resistors R–1 to R–12. A fraction of this input signal is selected by the setting of the range switch S–4 and such input signal activates the cathode follower arrangement. When the grid of the tube goes positive the flow of plate current becomes larger than the flow of current through the resistor R-19 and the result thereof is a meter indication in a positive direction. The capacitor C-8 and resistor R-16 eliminate the possibility of electrostatic charges from reaching the grid of the tube.

Thus, in the use of the apparatus for the measurement of a D.-C. voltage applied to the input terminals 19 and 20, the filament switch 15 is closed and resistor R-18 is adjusted so that the pointer of the instrument 24 is alined with the zero mark on the associated, calibrated scale. The range switch S-4 is set so that the position of the pointer of the instrument 24 is readily readable relative to the scale. As is conventional in the instrument art, the various positions of the range switch S-4 correspond to the range of the calibrated scale as determined by the values of the resistors R-1 to R-12. Thus, for example, if the range switch is set to the 160 position the range of the instrument scale is 0-160 volts whereas a switch setting at, say, 40 results in an instrument scale range of 40 volts. The ohmic value of the individual resistors R-1 to R-12 is selected so that the fractionating of the input voltage is accomplished in steps having selected ratios whereby a single scale on the instrument serves to provide accurate readings of the input voltage applied across the terminals 19, 20. Obviously, the meter 24 may be provided with a plurality of differently graduated scales, if such be desired. It will be apparent that the apparatus terminals 19, 20 may be marked with polarity signs so as to assure an up-scale meter indication. Alternatively, the meter may be connected to the bridge diagonals through a conventional reversing switch so as to obviate the need for reversing the connections to the terminals 19, 20 when the polarity of the D.-C. voltage being measured is such as to swing the grid of the tube negatively.

In the measurement of peak-to-peak voltages the knob 17, controlling the position of the movable contacts of the switches S-1, S-2 and S-3, is rotated to aline the index pointer 16 with the reference mark PEAK. The circuit across the apparatus terminals 19, 20 may now be traced as folows; lead 30, the now closed contacts 31, 32 of the switch S-1, lead 33, the capacitor C-1, lead 34, now closed contacts 35 and 36 of the switch S-2, lead 37, the resistors R-1 to R-12, and lead 38. It will be apparent that the series of resistors R-1 to R-12 are shunted by the capacitors C-2, C-3 and C-4, and that the capacitor C-1 is in series with such parallel network. Actually, the resistance across the apparatus terminals 19, 20 is 1 megohm shunted by a capacitance of 50 mmf and in series with the capacitor C-1. A portion of the voltage appearing across the resistance network R-1 to R-12, as selected by the setting of the range switch S-4, furnishes a signal to the grid of the tube through the lead 40, capacitor C-5, lead 41, the now closed contacts 42, 43 of the switch S-3, and the lead 44. It will be noted that the closure of the contacts 45, 46 of the switch S-3 connects the tube cathode to the tube grid through the capacitor C-6, rectifier CR-2 and resistor R-20. The common junction of the rectifier CR-2 and the resistor R-20 is connected to the apparatus terminal 20 and the cathode battery 22 through the capacitor C-7 and the common junction between the rectifier CR-2 and the capacitor C-6 are also connected to such terminal and battery through the rectifier CR-1. The conventional D.-C. current flow in the plate circuit of the tube is modulated by the A.-C. signal applied to the tube grid thereby causing an A.-C. voltage to appear at the cathode. Such A.-C. voltage at the cathode is rectified by passing through the rectifiers CR-2 and CR-1 and produces across the capacitor C-7 a D.-C. voltage that is equal to the peak-to-peak value of the A.-C. voltage applied to the grid. The voltage across the capacitor C-7 is reintroduced to the grid of the tube as D.-C.; thus creating a D.-C. unbalance in the cathode follower and thereby causing the meter 24 to indicate. It is important to note that the D.-C. voltage of the capacitor C-7 is superposed on the A.-C. input signal to the tube yet isolated therefrom. The series resistors R-1 to R-12 serve as voltage dividers at frequencies below 2,000 cycles per second and the capacitors C-2 to C-4 serve as dividers at frequencies above 2,000 cycles for the lower voltage ranges of the instrument, say 8 and 40 volt ranges.

The circuit for the normal measurement of A.-C. voltages basically is the same as the peak-to-peak circuit with the addition of an attenuator consisting of the resistor R-15 and capacitor C-10. Such attenuator is connected between the apparatus terminal 19 and the capacitor C-1 when the switches S-1 and S-2 are set to the A.-C. position, as indicated by alignment of the index pointer 16 with the reference mark AC. Inasmuch as there are jumpers between the contacts 42, 50 and 45, 51, of the switch S-3, it is apparent that the remainder of the circuitry remains the same for either the A.-C. or peak-to-peak setting of this switch. The attenuator, consisting of the resistor R-15 and capacitor C-10, increases the input impedance, across the terminals 19, 20, to a resistance of 2.83 megohms which reduces the sensitivity to give the correct *rms* reading on the meter 24.

From the above description of the invention those skilled in this art will recognize the particular advantages of the arrangement for the measurement of voltages. Specifically, a. the circuit has a desirably high input impedance;
b. there is a complete absence of D.-C. voltages due to contact potentials and thermionic emission;
c. the scale distribution of the voltage ranges on the indicating instrument remain constant for the various measurement functions to be performed;
d. the use of common components and a simple switching arrangement for the measurement of D.-C. voltages; and
e. the adaptability of the circuit for use with battery operation to give complete isolation from power lines resulting in complete safety of operation and freedom from stray voltages and making possible the provision of a portable, completely self-contained instrument.

These advantages are obtained in an electronic measuring instrument having extreme stability of zero reading with changes in the measuring ranges and in the character of the voltages to be measured.

While I have illustrated a circuit wherein the output of the tube is taken from the cathode, those skilled in this art will understand that the output voltage of the tube (which is rectified and superposed on the grid) can be taken from the plate circuit. Also a filamentary type cathode tube may be employed in place of the illustrated type having a separately heated cathode. These, and other changes and modifications, may be made without departing from the basic concept of the invention.

Having now described my invention in detail in accordance with the requirements of the patent statutes what I desire to protect by Letters Patent of the United States is set forth in the following claims.

I claim:

1. Apparatus for the measurement of voltages comprising an electron tube having an anode, a grid and a cathode, D.-C. voltage sources energizing the said anode and the said cathode, opposed polarity terminals of said sources being connected together and said sources forming the two adjacent arms of a bridge; a resistor connected in series with the cathode and one of the voltage sources, said resistor forming a third arm of the bridge and the fourth bridge arm being constituted by the space path between the tube plate and cathode; a D.-C. indicating instrument connected across a diagonal of the bridge that includes the connected terminals of said voltage sources; a first capacitor having one end connected to the common terminals of said voltage sources; means including a manually-operable switch to connect the other end of said capacitor to the tube grid; a pair of rectifiers connected in series across the said first capacitor; means including a manually-operable switch to connect the common junction of said rectifiers to the tube cathode; and circuit elements to impress the voltage to be measured across the tube grid and the common terminal of the voltage sources.

2. Apparatus for the measurement of voltages comprising a pair of input terminals; an electron tube having an anode, a grid and a cathode; D.-C. voltage sources energizing the said anode and the said cathode said sources having opposed polarity terminals connected together and to one input terminal; a resistor connected in series with the cathode and one of the voltage sources; a D.-C. indicating instrument having a pointer movable over a scale calibrated in volts, said instrument being connected between the cathode and the common terminal of the voltage sources; a voltage divider consisting of a plurality of calibrated resistors; a first capacitor; switch means operable to connect the voltage divider and the first capacitor in parallel arrangement across the said input terminals; switch means operable to connect a selected resistor of the voltage divider to the tube grid; a second capacitor having one end connected to the said one input terminal; switch means operable to connect the other end of the second capacitor to the tube grid; a pair of rectifiers connected in series and across the second capacitor; and switch means operable to connect the common junction of the rectifiers to the tube cathode.

3. Apparatus for the measurement of an A.-C. voltage comprising an electron tube having a grid, a cathode and an anode, a D.-C. voltage source connected between the anode and a common ground connection and biasing the anode at a predetermined level, a cathode resistor, a D.-C. indicating instrument, means connecting the said cathode resistor and D.-C. indicating instrument in series between the said cathode and common ground connection, a first capacitor having one end connected to the common ground connection, a pair of rectifiers connected in series across the said first capacitor, means including a second capacitor connecting the common junction between the said rectifiers to the tube cathode, means connecting the other end of the first capacitor to the tube grid, and circuit elements to impress the voltage to be measured across the tube grid and the common ground connection.

4. The invention as recited in claim 3 including means adjustable to reduce the current flow through the D.-C. indicating instrument to zero.

5. The invention as recited in claim 3 wherein the said means connecting the other end of the first capacitor to the tube grid includes a first switch means, and the said means connecting the common junction between the said rectifiers to the tube cathode includes a second switch means.

References Cited in the file of this patent

UNITED STATES PATENTS

| | | |
|---|---|---|
| 2,369,066 | Maxwell | Feb. 6, 1945 |
| 2,459,081 | Kunz | Jan. 11, 1949 |
| 2,493,336 | Burger et al. | Jan. 3, 1950 |
| 2,547,978 | Ryerson et al. | Apr. 10, 1951 |
| 2,713,663 | Cabbe | July 19, 1955 |

FOREIGN PATENTS

| | | |
|---|---|---|
| 525,690 | Great Britain | Sept. 3, 1940 |
| 662,822 | Germany | May 31, 1933 |
| 645,769 | Great Britain | Nov. 8, 1950 |

OTHER REFERENCES

Rider, Vacuum Tube Voltmeters, pp. 57 and 58, NYC. 1941.

Article by Ernest J. Schultz published in Radio News, Aug. 1949, pages 52, 94 and 96 (only page 52 relied upon). (Copies available in Scientific Library.)